March 6, 1934. A. W. BURKS Re. 19,101
PUMP
Original Filed Dec. 11. 1925 2 Sheets-Sheet 1
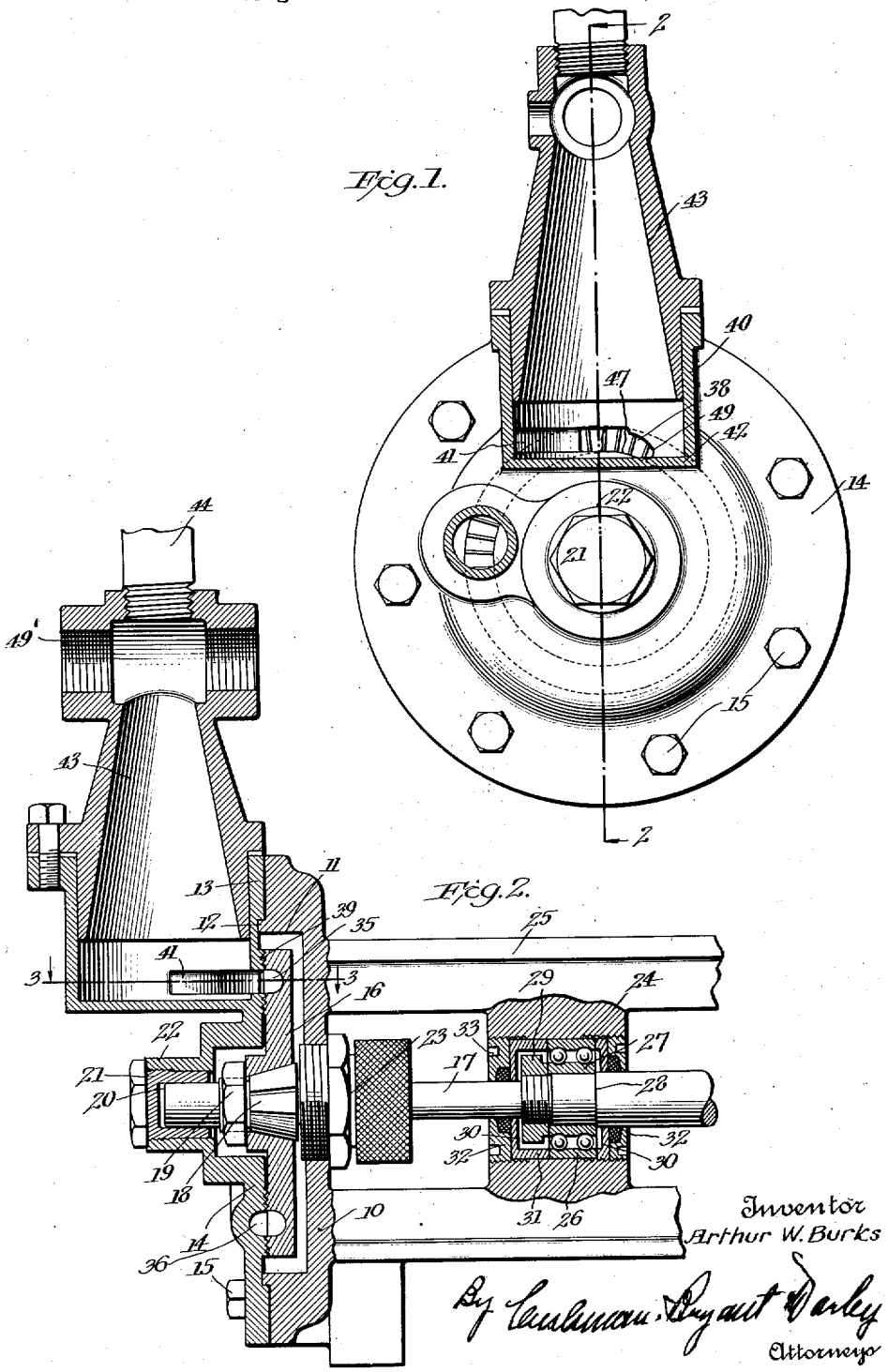

March 6, 1934. A. W. BURKS Re. 19,101

PUMP

Original Filed Dec. 11, 1925 2 Sheets-Sheet 2

Inventor
Arthur W. Burks.
By Lewis man, Bryant & Darby
Attorneys

Reissued Mar. 6, 1934

Re. 19,101

UNITED STATES PATENT OFFICE 19,101

PUMP

Arthur W. Burks, Decatur, Ill.

Original No. 1,686,549, dated October 9, 1928, Serial No. 74,807, December 11, 1925. Application for reissue May 3, 1929, Serial No. 360,288

23 Claims. (Cl. 103—96)

The present invention relates to pumps, and more particularly to pumps of the type which comprises a casing having an inlet opening and an outlet opening, respectively, for the reception and discharge of fluid and a rotor or impeller therein, provided with a plurality of fluid impelling buckets or vanes. As specific examples of such pumps, reference is had to my copending application Serial No. 444,830, filed Feb. 14, 1921, and Serial No. 474,100, filed June 1, 1921.

This type of pump has been found to be highly efficient in actual use, when constructed in accordance with the disclosure of said applications.

An objection, however, which develops is that at times the pump will very unexpectedly fail to deliver fluid, either gas, such as air, or liquid. In other words, the rotor simply revolves without receiving or discharging air or liquid.

An object of the invention is to provide means which will prevent these interruptions in the operation of the pump, and which will, furthermore, render the same efficient in working with a gaseous fluid, such as air.

A further object of the invention is to provide means for bodily adjusting the rotor relative to the casing, whereby a substantially fluid-tight seal may be maintained between at least one face of the rotor and the casing wall.

The invention comprises broadly the provision of a chamber or pocket, preferably outside the discharge opening and therethrough, in communication with the buckets of the rotor, the chamber being arranged to retain a body of liquid which receives a whirling movement from the rotor as the latter is operated. The chamber is of a size sufficient to permit the fluid, when given a whirling movement, to be formed into a substantially continuous circular wall with the air which is discharged from the impeller passing to the center of the moving body and onwardly from the chamber. When liquid is being pumped, the same will remain within the chamber in sufficient quantities to maintain constantly the whirling body described. The chamber is so constructed and arranged that when gaseous fluid, such as air, is being pumped, a body of liquid injected into the chamber will remain therein, and only the pumped air will be discharged, the same passing through the body of liquid in the manner described.

In other words, the invention comprises the arrangement of a liquid pocket or chamber preferably at the discharge opening of the pump, and more specifically, the chamber is arranged so that the whirling fluid therein travels in a path to which the path of the rotor and its buckets is substantially tangential. The whirling fluid repeatedly engages the buckets as they pass the outlet opening through which the chamber is in communication with the bucket and the interior of the casing.

In this type of pump it is desirable to provide a substantially fluid-tight seal or joint between at least one lateral face of the rotor and the casing, this seal being ordinarily disposed radially with respect to the buckets and raceway. In the particular embodiment of the invention herein disclosed, a seal is effected on both sides of the series of buckets. In order to maintain only the necessary working clearance between the face of the rotor and the casing, there is positioned upon the exterior of the casing a means for bodily adjusting the rotor relative to the casing. This means in the present instance comprises a stationary bearing in which is located a raceway for roller bearings. A rotary drive shaft extends through this bearing and is longitudinally shiftable to adjust the rotor relative to the casing, the adjustment means comprising plugs arranged within the bearing.

In the accompanying drawings there is shown a preferred embodiment of the invention, and in these drawings:—

Figure 1 is a face view of the pump with the liquid chamber shown in vertical section.

Figure 2 is a vertical section, the same being taken through the structure shown in Figure 1, on substantially the line 2—2.

Figure 3:
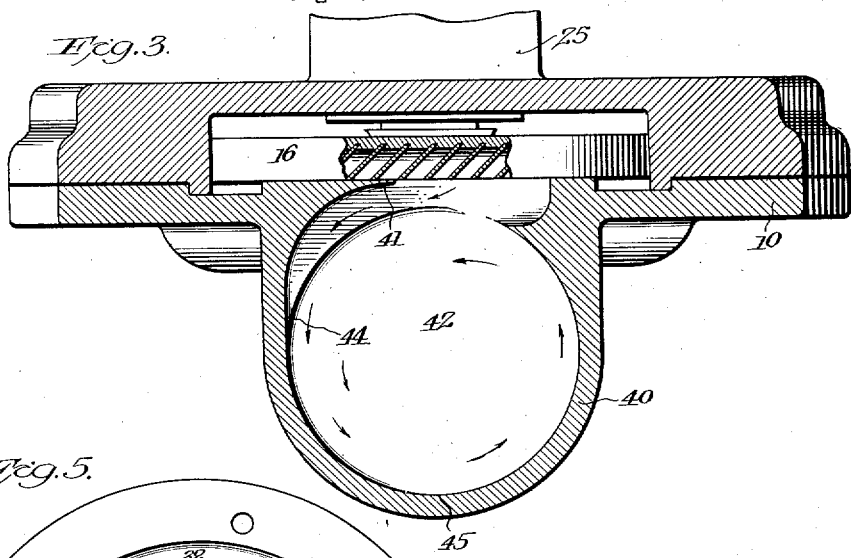
Figure 3 is a horizontal section on the line 3—3 of Figure 2.

In the drawings 10 indicates a casing section which is interiorly recessed to form a marginal flange or wall 11, having a face rib 12, which interfits with the peripheral flange 13 on a second casing section 14 secured to the section 10, as by means of bolts 15 passing through the two sections.

Within the casing is positioned a rotor element 16, which is fixedly mounted upon a rotor shaft 17 by means of a beveled enlargement 18 upon the shaft within a centrally arranged aperture in the rotor, the aperture being correspondingly tapered so that the rotor may be locked upon the enlargement 18 by means of a lock nut 19 threaded upon the shaft. It will be noted that the end 20 of the shaft is spaced from the end of a removable bearing plug 21, which is threaded within a boss 22, upon the casing section 14, thus permitting longitudinal adjustment of the shaft and rotor within the casing. The shaft extends rearwardly through the casing section 10 and a suitable packing box 23 to driving means, such as an electric motor (not shown). Spaced from the casing 10 the shaft has a stationary bearing 24, which is carried by bars 25, preferably cast integrally with the casing. This bearing is of sufficient size to receive a roller bearing raceway element 26, which surrounds a bushing 27 upon the shaft, the latter being fixedly held against a shoulder 28 on the shaft by a lock nut 29. At opposite sides of the roller bearing are positioned collars 30, 30, having peripheral extending flange portions 31, the collars being slidable longitudinally of the shaft and abutting adjusting nuts 32, 32, threaded within the bearing and having sockets 33, which may be engaged by a spanner wrench or similar tool. As will be understood, adjustment of these nuts will shift the rotor shaft longitudinally, due to the abutment of the plugs with the collars, which in turn abut the cage for the roller bearings.

The purpose of this adjustment is to maintain a suitable working clearance between the rotor 16 and the casing, the desirability of which will be clearer as the construction of the rotor and the cooperating parts of the casing is described.

Referring to the rotor, the same consists of a relatively flat or disc-like element, which has a circular series of buckets 35 arranged on faces, in the present instance in a lateral face, of the rotor and cooperating with a circular fluid raceway 36, the casing section 14 having an inlet opening 37 communicating with said raceway, and therethrough with a discharge opening 38. In order to close the raceway at each side, the rotor makes a substantially fluid-tight joint on opposite sides thereof with the casing, and the effectiveness of this joint is improved by means of coacting ribs and grooves 39 upon the casing and rotor. Of course, it is necessary to maintain between the rotor and the casing at these interfitting ribs and grooves a suitable working clearance so that objectionable friction will not be set up. The provision of the adjustable bearing heretofore described permits this and after wear has occurred, it is simply necessary to adjust the bearing to take up such clearance as permits leakage, thus avoiding the necessity for renewing either the rotor or the casing.

It will be understood that the fluid being pumped may be either air or liquid or both, and the same will enter the casing through the inlet opening 37, where it will be engaged by the buckets of the rotor as the latter is operated and carried through the raceway in the casing to the discharge opening 38, the fluid being operated upon by the buckets in a manner which will be fully understood by one familiar with the operation of this type of pump.

As has been before explained, this type of pump has not heretofore been particularly efficient when operating upon gaseous fluid alone such as air, and, furthermore, when pumping liquid the discharge therefrom is often suddenly interrupted, although movement of the rotor continues. For the purpose of rendering the pump efficient in operating upon gaseous fluid, and to avoid this failure in operation, there is provided means for maintaining in communication with the buckets, a body of liquid which will be given a continuous movement by the rotor as it is operated; and it is found that this arrangement prevents the rotor from ceasing to function satisfactorily, or, in other words, from becoming "air bound", as this condition may be conveniently termed.

Figure 5:
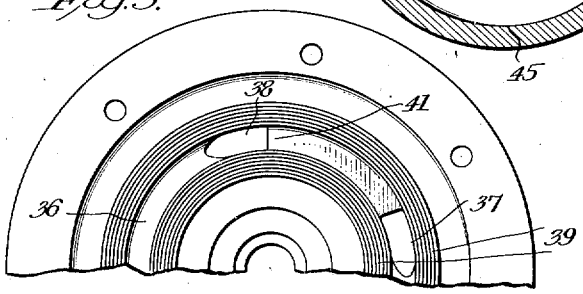
Figure 5 is a fragmentary view of the inner face of the casing section provided with the raceway and the inlet and discharge openings.
Figure 4:
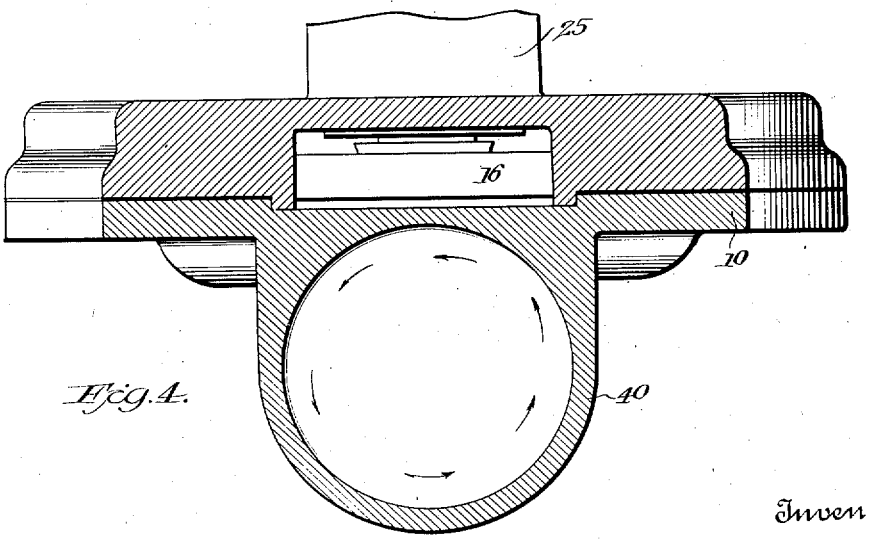
Figure 4 is a horizontal section on the line 4—4 of Figure 2.

Preferably, the body of liquid is maintained at the outlet opening 38, and for this purpose there is provided a chamber 40 outside the discharge opening 38, and communicating through the latter with the buckets of the rotor which pass the discharge opening as the rotor is operated. It will be understood that the raceway extends around the casing from the inlet opening 37 to the discharge opening 38 (Figure 5) and the fluid travels therethrough in a counterclockwise direction as viewed in Fig. 1. However, the casing is not formed with a raceway in the short space between the two openings, the raceway at this point being closed by a short wall or web 41 (Fig. 5), which parallels and closely fits against the face of the rotor to prevent the passage of any substantial amount of air or liquid from the discharge opening to the inlet opening after the same has been once conducted by the rotor through the raceway. It will be noted that the wall or web 41 begins immediately at the discharge opening 38 (Fig. 3) and forms a portion of the wall of the chamber 40. This chamber has its bottom 42 arranged in a plane substantially intersecting the inner edge of the series of buckets as they pass the discharge opening. The chamber is open at its top and has leading therefrom a discharge passage 43, which progressively tapers in cross section away from the chamber and communicates with the outlet pipe 44. As the rotor buckets pass the discharge opening 38 any liquid which is carried by them will be discharged through the opening into the chamber and the wall of the latter, in the plane of the web 41, is undercut (Figs. 2 and 3) so that the wall 41 gradually merges at 44 into the chamber side wall 45. Liquid discharged into the chamber will, under the influence of centrifugal force naturally seek the wall 45 and will have a whirling motion. The repeated discharges into the chamber will impart force to the liquid ahead and the result will be the formation of a whirling body of liquid, as indicated by the arrows in Figure 3. As the body of liquid whirls, the same will, of course, pass the opening 38, and, under the influence of centrifugal force, will tend to pass back through the outlet opening and thus engage the buckets through this opening. The setting up of undesirable eddy currents at the opening 38 is satisfactorily avoided by the upward curving of the discharge opening 38, as indicated at 47. This curve which corresponds to the curve of the raceway and series of buckets naturally causes the incoming fluid to be thrown upwardly and the whirling liquid within the chamber will engage the buckets at the lower end 49 (Figure 1).

It has been observed that in the operation of the pump any gaseous fluid, such as air, will seek the center of the whirling body of liquid within the chamber 40, since the liquid therein will be arranged in a relatively narrow moving wall. The air will pass on through the outlet passage 43, and the liquid will remain within the chamber in sufficient quantities to maintain constantly the whirling body referred too which receives its movement due to the repeated introduction of liquid from the propeller into the chamber and also to repeated engagement with the buckets during its whirling movement.

11. In a pump, a rotor having a plurality of buckets, a casing in association with the rotor having an inlet and having an outlet opening, and means for maintaining at said outlet opening a moving body of liquid which is given a whirling movement by said rotor as it is operated, said body of liquid engaging said buckets as they pass said opening and the liquid repeatedly passing said opening in said whirling movement, said means being formed to permit the discharge of gaseous fluid from the rotor through said body of liquid, while retaining the body in operative association with said rotor.

12. In a pump, a casing, a substantially circular fluid raceway therein, said casing having an inlet opening and an outlet opening, a rotor having a substantially circular marginal series of buckets cooperating with said raceway, the rotor making a substantially water-tight joint with the casing radially inwardly from said raceway, and means outside the outlet opening for maintaining a body of liquid in position to have imparted thereto by said rotor a whirling movement in which it engages the buckets as they pass.

13. In a pump, a rotor having buckets thereon, a casing having an inlet and outlet and means adapted to maintain adjacent the outlet as the rotor operates, a whirling body of liquid which separates air by centrifugal action, said means being so disposed that the centrifugal force set up by the whirling motion of the body causes the liquid thereof to engage the buckets.

14. In a pump, a bucket bearing rotor, means adjacent the rotor for retaining a whirling body of liquid created by the rotor and for permitting separation of air and liquid by the centrifugal action of said body, said means being in direct communication with the rotor buckets so that the whirling liquid of the whirling body may repeatedly engage the rotor buckets and cause to be passed into the body air from said rotor, and means for permitting discharge from said first mentioned means of air separated from said whirling body.

15. The method of pumping a mixture of liquid and gaseous fluid with a rotor having a series of buckets which consists in forming a liquid whirlpool having a substantially vertical axis adjacent the path of the buckets and by the action thereof, and maintaining said whirlpool so that the whirling motion stratifies the air and the centrifugal force set up causes the whirling liquid thereof to engage the rotor buckets.

16. The method of pumping a mixture of liquid and gaseous fluid with a rotor having a series of buckets which consists in forming a liquid whirlpool adjacent the path of the buckets and by the action thereof, maintaining said whirlpool so that the whirling motion tends to separate air therefrom and the centrifugal force set up causes the liquid thereof to engage the rotor buckets, and conducting off the air separated by the centrifugal action of said whirlpool.

17. The method of priming a pump having a bucket bearing rotor, a suction inlet and an outlet which comprises setting up adjacent the path of said rotor and by the action thereof, a whirling body of liquid which stratifies air by centrifugal action and permitting whirling liquid of the whirling body to engage the buckets.

18. The method of priming a pump having a bucket bearing rotor a suction inlet and an outlet which comprises setting up adjacent the path of said rotor and by the action thereof, a whirling body of liquid which stratifies air by centrifugal action and utilizing the centrifugal force to cause the whirling liquid of the whirling body to engage the buckets while collecting the stratified air from the whirling body.

19. The method of pumping a mixture of liquid and gaseous fluid in a pump having a casing with an outlet and a rotor provided with a series of buckets, which consists in maintaining immediately adjacent the path of the buckets and exterior to the casing outlet a body of liquid, imparting to said body by the rotor buckets a whirling movement in the course of which the whirling liquid at the outer portion of the whirl engages the buckets through the outlet, displacing gaseous fluid from the buckets into the whirling body by the repeated engagement of the liquid with the buckets, and separating the gaseous fluid from the whirling body by the centrifugal action set up.

20. The method of pumping gaseous fluid in a pump comprising a rotor with a plurality of buckets which consists in maintaining adjacent the path of the buckets a body of liquid, whirling said body by the rotor as it is operated, and maintaining the whirling body so that it tends to separate air by centrifugal force while the centrifugal action set up causes the whirling liquid to engage the buckets.

21. In a pump, a casing having a fluid inlet and a fluid outlet, a rotor in said casing having fluid impelling buckets thereon and immediately at said outlet a chamber of substantially circular cross-section with its wall substantially tangential to the path of said buckets and in communication with the buckets at said outlet, the chamber serving to receive and retain liquid discharged through the opening and arranged to have imparted to the liquid therein by said buckets a whirling movement which serves to separate air by centrifugal action.

22. In a self-priming liquid pump, a casing having a supply inlet for air and liquid to be pumped, and an air and liquid outlet, a rotor in said casing having a series of liquid impelling buckets, and a substantially circular separator chamber near the outlet opening and adapted to maintain as the rotor operates a whirling body of liquid which separates air by centrifugal action, said separator being disposed so that liquid from the whirling body may engage the rotor buckets through said outlet and cause to be passed into the whirling body air from the rotor.

23. In a self-priming liquid pump, a casing having an inlet for air and liquid to be pumped and an air and liquid outlet, said inlet being adapted for connection to a liquid suction line, a rotor in said casing having a series of liquid impelling buckets, an annular channel in said casing cooperating with said buckets and through which the air and liquid are driven by the buckets to said outlet, and a substantially circular chamber near the outlet adapted to maintain as the rotor operates a whirling body of liquid which separates air by centrifugal action, said chamber being disposed so that the centrifugal force set up by the whirling liquid causes liquid from the whirling body to engage the rotor buckets through said outlet and causes to be passed into the whirling body air from the rotor.

ARTHUR W. BURKS.

The tapering outlet passage 43 is provided for the purpose of maintaining further on in the discharge line the relatively high pressure which is found to exist in the chamber where the water has a whirling action; an abrupt change from the chamber diameter to the diameter of the outlet pipe 44 would result in a loss of this pressure. Furthermore, when the pump is operating upon gaseous fluid alone, as, for instance, when building up air pressure in the pumping system, the taper serves to retain in the chamber the body of fluid which is introduced thereinto for the purpose of providing the water seal at the discharge opening.

In the operation of the pump, upon gaseous fluid such as air, a certain amount of liquid will be introduced into the chamber 40, for instance, through a priming opening 49′ in the discharge passage 43, and then the inlet opening 37 will be placed in communication with a source of air or other gaseous fluid. Operation of the rotor will result in pumping of the gaseous fluid, which will be discharged through the discharge opening 38 and the body of liquid therein, the gas seeking the center of the liquid and passing on outwardly through the outlet pipe 44. When pumping liquid it will be found that there will be constantly retained within the chamber a sufficient portion thereof to provide the whirling body hereinbefore described.

Obviously, numerous changes may be made in the structure illustrated and described without departing from the invention, the essential features of which are set forth in the following claims.

I claim:

1. In a pump, a casing having a fluid inlet and a fluid outlet, a rotor in said casing having fluid impelling buckets thereon, and a chamber disposed adjacent the path of said buckets, said chamber being in communication with the rotor through an opening and being arranged to retain a body of liquid therein and to permit the same to receive from the buckets through said opening a movement in which it engages the buckets as the rotor is operated.

2. In a pump, a casing having a fluid inlet and a fluid outlet, a rotor in said casing having fluid impelling buckets thereon, and a chamber disposed adjacent the path of said buckets, said chamber being in communication with the rotor through an opening and being arranged to retain a body of liquid therein and to permit the same to receive from the buckets through said opening a whirling movement in which it engages the buckets as the rotor is operated.

3. In a pump, a casing having a fluid inlet and a fluid outlet, a rotor in said casing having fluid impelling buckets thereon, and a chamber disposed adjacent the path of said buckets, said chamber being in communication with the rotor through an opening and being arranged to retain a body of liquid and to permit the same to be engaged by the buckets and to receive therefrom through said opening a movement in which it engages the buckets as the rotor is operated, said chamber being disposed to permit movement of the fluid therein through a path with respect to which the path of said buckets is substantially tangential.

4. In a pump, a casing having a fluid inlet and a fluid outlet, a rotor in said casing having fluid impelling buckets thereon, and a chamber at said outlet opening communicating through the same with the buckets, the chamber serving to receive and retain liquid discharged through the opening and being arranged to have imparted to the liquid therein by said buckets a continuous movement in which the liquid is engaged by the buckets as they pass said opening.

5. In a pump, a casing having a fluid inlet and a fluid outlet, a rotor in said casing having fluid impelling buckets thereon, and a chamber at said outlet opening communicating through the same with the buckets, the chamber serving to receive and to have pass therethrough gaseous fluid discharged through the opening and serving to retain a body of liquid which has imparted thereto by said buckets a whirling movement in which the liquid is engaged by the buckets as they pass said opening.

6. In a pump, a casing having a fluid inlet and a fluid outlet, a rotor in said casing having fluid impelling buckets thereon, and a chamber at said outlet opening communicating through the same with the buckets, the chamber serving to retain constantly a body of the liquid discharged through the opening and being arranged to have imparted to the liquid therein by said buckets a whirling movement in which the same is engaged by the buckets as they pass said opening, said buckets having a path of travel substantially tangential to the path of said fluid in the chamber.

7. In a pump, a casing having a fluid inlet and a fluid outlet, a rotor in said casing having fluid impelling buckets thereon, a chamber disposed adjacent the path of said buckets, said chamber being in communication with the rotor through an opening and being arranged to retain a body of liquid which receives from the buckets through said opening a movement in which it engages the buckets as the rotor is operated, and an outlet passage of progressively reducing area leading from said chamber.

8. In a pump, a casing having a fluid inlet and a fluid outlet, a rotor in said casing having fluid impelling buckets thereon, a chamber disposed adjacent the path of said buckets, said chamber being in communication with the rotor through an opening and being arranged to retain a body of liquid and to permit the same to be engaged by the buckets and to receive therefrom through said opening a movement in which it engages the buckets as the rotor is operated, said chamber being disposed to permit movement of the fluid therein through a path with respect to which the path of said buckets is substantially tangential, and an outlet passage of progressively reducing area leading from said chamber.

9. In a pump, a casing having a fluid inlet and a fluid outlet, a rotor in said casing having fluid impelling buckets thereon, a chamber at said outlet opening communicating through the same with the buckets, the chamber serving to receive and retain liquid discharged through the opening and being arranged to have imparted to the liquid therein by said buckets a continuous movement in which the liquid is engaged by the buckets as they pass said opening, and an outlet passage of progressively reducing area leading from said chamber.

10. In a pump, a rotor having a plurality of buckets, a casing in association with the rotor having an inlet and having an outlet opening, and means for maintaining at said outlet opening a moving body of liquid which is given a whirling movement by said rotor as it is operated, said body of liquid engaging said buckets as they pass said opening and the liquid repeatedly passing said opening in said whirling movement.